(12) United States Patent
Sewell et al.

(10) Patent No.: US 11,185,803 B2
(45) Date of Patent: Nov. 30, 2021

(54) DRILLING FLUID RECLAIMER

(71) Applicant: The Charles Machine Works, Inc., Perry, OK (US)

(72) Inventors: Cody L. Sewell, Perry, OK (US); Brant Douglas Kukuk, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 146 days.

(21) Appl. No.: 16/521,372

(22) Filed: Jul. 24, 2019

(65) Prior Publication Data

US 2019/0344203 A1    Nov. 14, 2019

Related U.S. Application Data

(63) Continuation of application No. 15/602,189, filed on May 23, 2017, now Pat. No. 10,399,017, which is a
(Continued)

(51) Int. Cl.
| | |
|---|---|
| *B01D 33/03* | (2006.01) |
| *B01D 33/41* | (2006.01) |
| *B01D 33/62* | (2006.01) |
| *B01D 33/80* | (2006.01) |
| *B01D 35/20* | (2006.01) |

(Continued)

(52) U.S. Cl.
CPC ......... *B01D 33/62* (2013.01); *B01D 33/0376* (2013.01); *B01D 33/41* (2013.01); *B01D 33/72* (2013.01); *B01D 33/802* (2013.01); *B01D 35/20* (2013.01); *B07B 1/42* (2013.01); *B07B 1/46* (2013.01); *B07B 1/4609* (2013.01); *B08B 15/02* (2013.01); *E02F 3/8816* (2013.01); *E02F 3/907* (2013.01); *E21B 21/065* (2013.01); *E21B 21/066* (2013.01); *E21B 21/067* (2013.01); *B07B 2201/04* (2013.01); *B07B 2230/01* (2013.01)

(58) Field of Classification Search
CPC .... B01D 33/62; B01D 33/0376; B01D 33/41; B01D 33/802; B01D 33/72; B01D 35/20; B07B 1/46; B07B 1/4609; B07B 1/42; B07B 2230/01; B07B 2201/04; E21B 21/065; E21B 21/066; E21B 21/067; E02F 3/907; E02F 3/8816; B08B 15/02
See application file for complete search history.

(56) References Cited

U.S. PATENT DOCUMENTS

3,766,997 A * 10/1973 Heilhecker ........... E21B 21/065
                                                               175/66
4,634,535 A     1/1987 Lott
(Continued)

*Primary Examiner* — Benjamin L Lebron
(74) *Attorney, Agent, or Firm* — Tomlinson McKinstry, P.C.

(57) ABSTRACT

The present invention is directed to a drilling fluid reclaimer. The reclaimer has at least one adjustable screen assembly for providing a leveling filter for reclaimed drill fluid. Used drill fluid is placed at the screen assembly at the front the of the screen assembly. The at least one screen is vibrated to separate large particulate matter from liquid drilling fluid. A second screen is provided for additional filtering. Large particulate matter is expelled by a chute at the back of the screen assembly. Drilling fluid passing through the screen is "reclaimed" for use with a drilling system.

21 Claims, 7 Drawing Sheets

Related U.S. Application Data continuation of application No. 14/150,441, filed on Jan. 8, 2014, now Pat. No. 9,662,599.

(60) Provisional application No. 61/750,149, filed on Jan. 8, 2013, provisional application No. 61/833,084, filed on Jun. 10, 2013.

(51) Int. Cl.
| | | |
|---|---|---|
| *B07B 1/42* | (2006.01) | |
| *B07B 1/46* | (2006.01) | |
| *B08B 15/02* | (2006.01) | |
| *E02F 3/90* | (2006.01) | |
| *E21B 21/06* | (2006.01) | |
| *E02F 3/88* | (2006.01) | |
| *B01D 33/72* | (2006.01) | |

(56) References Cited

U.S. PATENT DOCUMENTS

| | | |
|---|---|---|
| 4,882,054 A | 11/1989 | Derrick et al. |
| 6,470,605 B1 | 10/2002 | Gilman et al. |
| 6,517,733 B1 | 2/2003 | Carlson |
| 7,523,570 B2 | 4/2009 | Pobihushchy |
| 2005/0242003 A1 | 11/2005 | Scott et al. |
| 2007/0163927 A1 | 7/2007 | Eia |
| 2007/0278012 A1* | 12/2007 | Smith .................. E21B 21/065 175/66 |
| 2008/0078699 A1 | 4/2008 | Carr |
| 2009/0120846 A1 | 5/2009 | Burnett |
| 2010/0196129 A1 | 8/2010 | Buckner |
| 2013/0112598 A1* | 5/2013 | Culver .................. E21B 21/066 209/10 |

\* cited by examiner

DRILLING FLUID RECLAIMER

SUMMARY

The present invention is directed to a reclaimer located proximate an excavation site. The reclaimer comprises a screen assembly, a conduit for transporting excavation fluid from the excavation site to the screen assembly, a first vibrator operatively attached to the screen assembly, and a leveling assembly for adjusting an orientation of the screen assembly.

DETAILED DESCRIPTION

The present invention is a reclaimer for regenerating excavation fluid to re-use the fluid in excavation operations. In ordinary excavation operations using horizontal directional drilling systems, drilling fluid is pumped through a drill string to a location proximate a drill head to lubricate the drill head and ease the process of drilling. After fluid is used at the point of drilling, it travels back up the borehole, collecting particulate matter such as drilling spoils, environmental dirt, and metal along the way. The fluid, upon returning to the surface, would be better described as used drill fluid, or "spent mud", unsuitable for reuse in the drill head due to the corrosive particles contained within it.

The reclaimer of the present invention provides a method for processing spent mud to remove particulate matter from the spent mud to reclaim drilling fluid for drilling operations. This decreases the amount of fluid required for an excavation operation.

Figure 1:
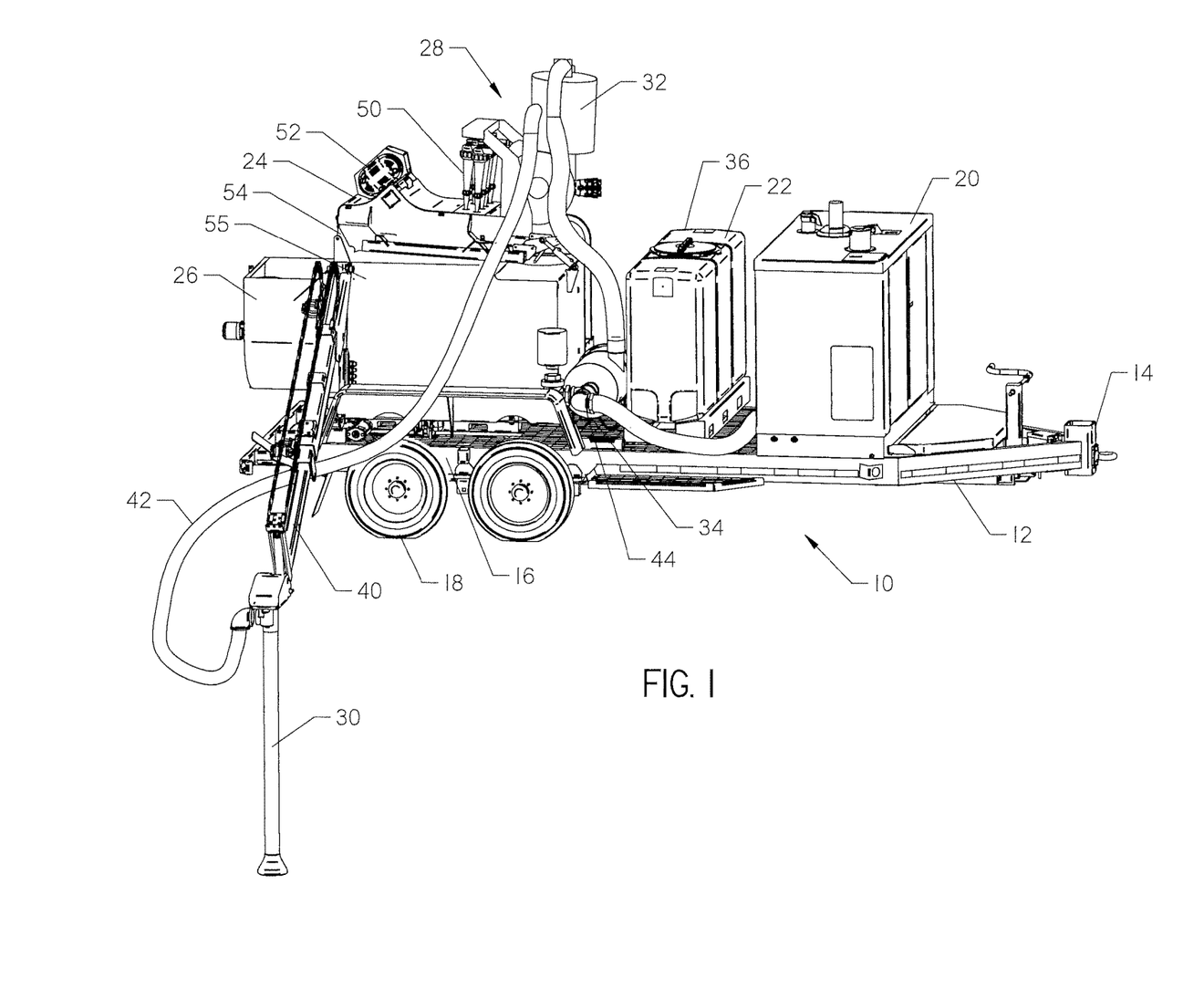
FIG. 1 is a side perspective view of a fluid reclaimer system of the present invention with a soft excavation arm.

With reference to the figures in general and FIG. 1 particularly, shown therein is a drilling fluid reclaimer system 10 in accordance with the present invention. The system 10 is shown on a trailer 12. The trailer 12 comprises a hitch 14, a frame 16, and a plurality of ground engaging members 18. The hitch 14 provides a connection to a vehicle (not shown) that pulls the system 10 to a job site. The frame 16 supports various components of the system 10, which will be discussed in greater detail below. The ground engaging members 18 as shown, are wheels. One of ordinary skill can appreciate that tracks may alternatively be used as ground engaging members 18, and that either wheels or tracks may be powered by a drive motor. Alternatively, the trailer 12 may be integrally formed with a self-powered truck.

Figure 7:
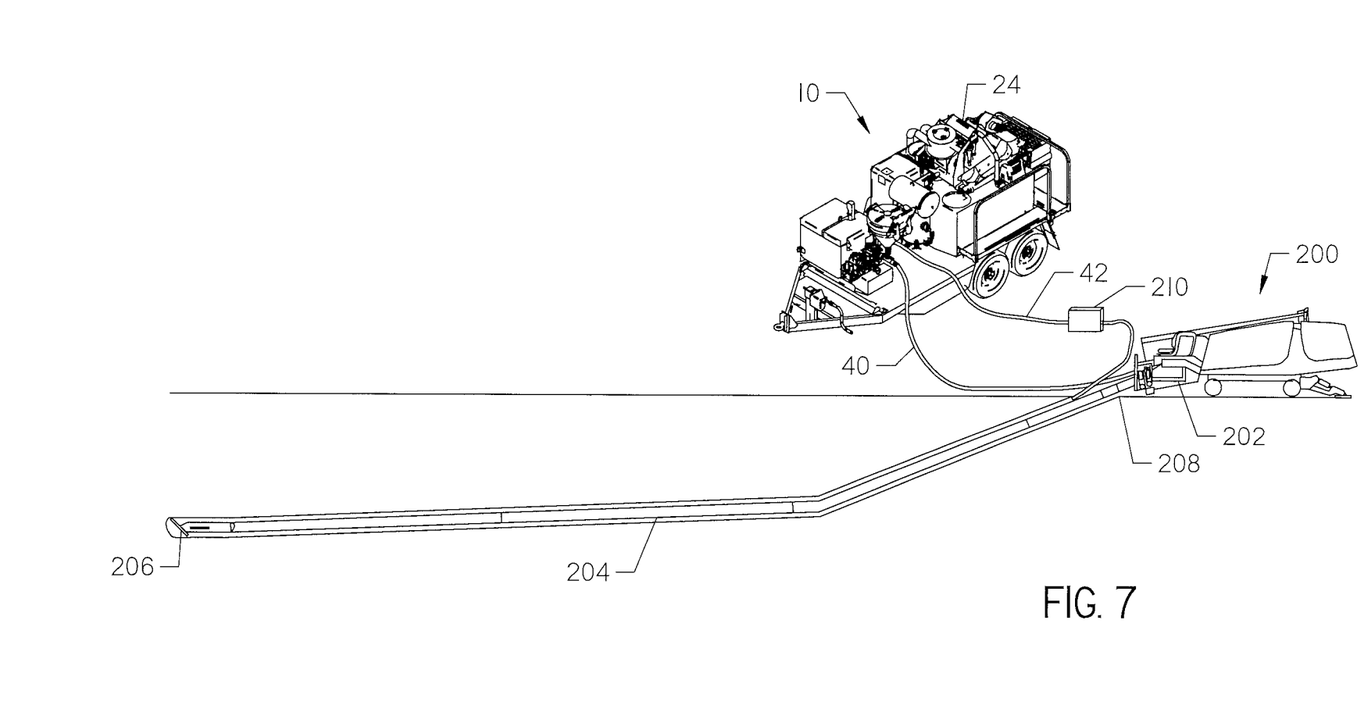
FIG. 7 is a side view of the fluid reclaimer system in use with a horizontal directional drilling system.

The system 10 comprises a power pack 20, a fluid tank 22, a reclaimer 24, and a mixer 26. The system 10 further comprises a fluid delivery system 28 for transporting fluid to and from an excavation site. As shown, the fluid delivery system 28 comprises a soft excavation unit 30, an airlock 32, and a pump 34. One skilled in the art will appreciate that other fluid delivery systems may be used with the reclaimer system 10 of the present invention, such as a system for delivering fluid to a downhole bit in a boring operation (FIG. 7).

The power pack 20 provides power for operating the various electronic and hydraulic components of the reclaimer system 10. The fluid tank 22 stores drilling fluid for use with the drilling fluid delivery system 28. Preferably, as shown in FIG. 1, the fluid tank 22 comprises multiple chambers 36. Each of the chambers may contain a different fluid, such as water, unused fluid, and recovered fluid from operation of the reclaimer system 10, as will be described in more detail below.

The fluid delivery system 28 further comprises a fluid delivery channel 40 and a fluid return channel 42. The fluid delivery channel 40 may be a hose or other delivery device to accommodate fluid as it moves from the fluid tank 22 to an excavation site. As shown, the excavation site is a location for soft excavation by the soft excavation unit 30. Fluid is moved from the fluid tank 22, through the fluid delivery channel 42 to the soft excavation unit 30. The fluid is then used to aid in soft excavation—the uncovering of a buried utility without the use of a bit.

The pump 34 provides a pressure to push new fluid and used fluid through the fluid delivery system. The pump 34 may be any commercially available pump suitable for pumping fluid used in excavation operations and may be operated by conventional means, such as hydraulic or electrical power.

As shown, the fluid delivery system may further comprise a vacuum system 44 for providing a vacuum pressure at the soft excavator 30. This pressure pulls used fluid mixed with particulate matter such as dirt (called "spent mud") into the fluid return channel 42 and into the airlock 32. The airlock 32 separates air from spent mud, as the air is pushed through the vacuum system 44. Spent mud leaves the airlock 32 and is applied to the reclaimer 24.

The reclaimer 24 comprises a plurality of desilter cones 50, a vibrator 52, a screen assembly 54, and a reclaimed fluid tank 55. Spent mud is processed through the plurality of desilter cones 50 to remove fluid from the courser particulates. One skilled in the art will appreciate that desilter cones 50 accept the spent mud tangentially into its body. The centrifugal force induced by the flow causes the heavier solids and slurries to separate from lighter material. The heaviest solids are deposited out the bottom of the cones 50 to the screen assembly 54 and the lighter liquid removed out the top for reuse. The desilter cones 50 are located above the screen assembly 54 and deposit spent mud thereon.

The vibrator 52 is attached to the screen assembly 54. Spent mud is processed on the screen assembly 54 by vibration of the vibrator 52. The vibrator 52 may vibrate the entire screen assembly 54 at the same frequency, or may alternatively comprise a first vibrator and a second vibrator to vibrate different parts of the screen assembly at different frequencies.

The reclaimer 24 processes the spent mud to cause particulate matter to be separated from the drilling fluid, or slurry portion, as will be described in greater detail with reference to FIG. 2 below. The drilling fluid is dropped into the reclaimed fluid tank 55 and then returned to a chamber 36 of the fluid tank 22. Particulate matter processed by the reclaimer 24 is dropped into the mixer 26.

The mixer 26 allows the particulate matter removed from the reclaimer 24 to dry, or for drying agents to be added to the particulate matter to aid in drying. Dry particulate matter may be left on the ground, or removed to a secondary site for further drying and processing.

Figure 2:
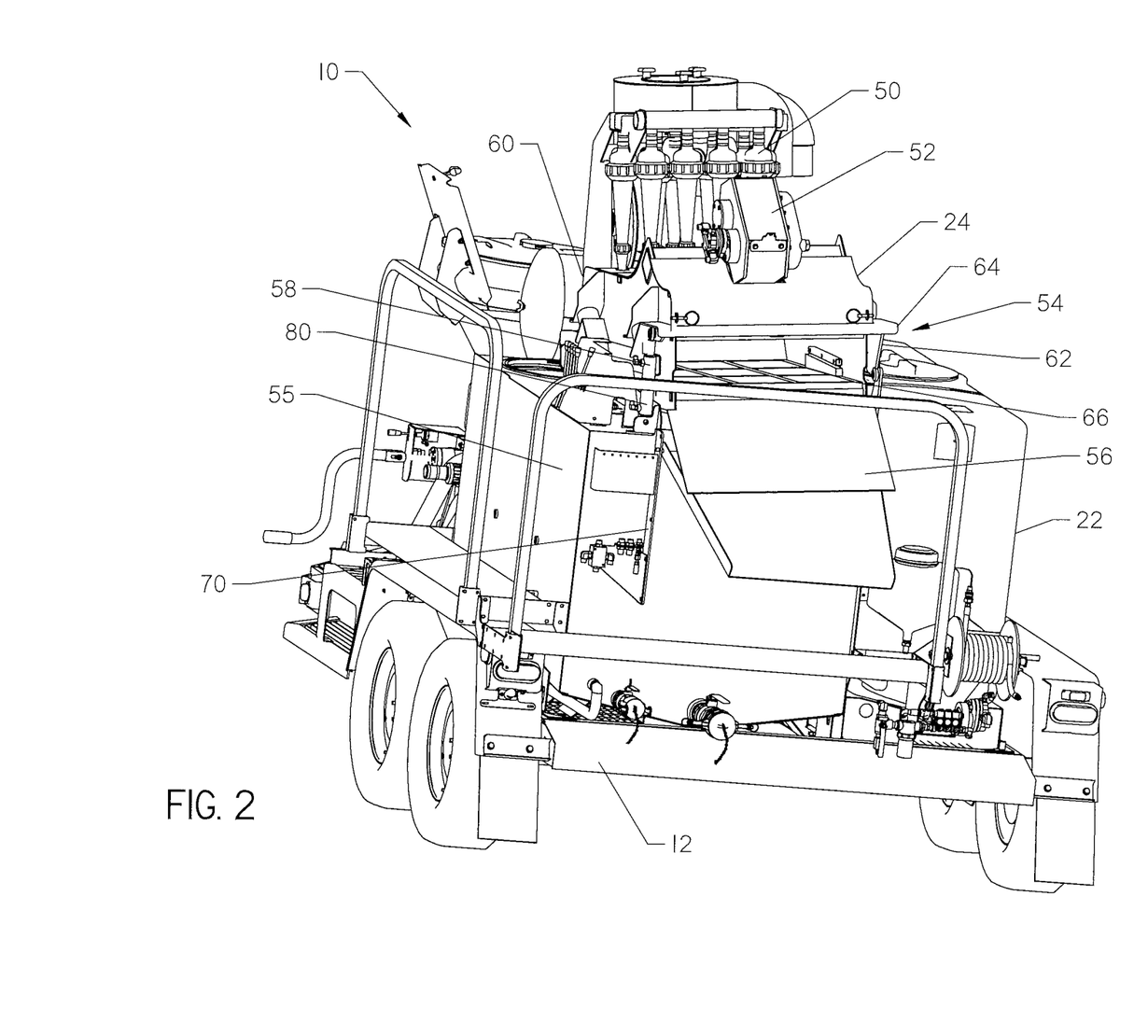
FIG. 2 is a back perspective view of an alternative embodiment of the fluid reclaimer system.

With reference now to FIG. 2, the system 10 is shown in an alternative configuration without the mixer 26 (FIG. 1) and with the fluid tank 22 located next to the reclaimer 24. This alternative configuration may be used with a horizontal directional drill (FIG. 7). The reclaimer 24 further comprises a chute 56 and a leveling assembly 58. As shown, desilter cones 50 are located at a first end 60 of the reclaimer and the chute 56 is located at a second end 62 of the reclaimer. The vibrator 52 is centered over the screen assembly 54 to enable uniform vibration throughout the screen assembly, if desired. The screen assembly 54 comprises a first screen 64 and a second screen 66. The first screen 64 is shown located above the second screen 66. The second screen 66 thus may comprise a finer mesh such that smaller particulate matter that passes through the first screen 64 is filtered out of the fluid by the second screen.

The chute 56 allows filtered particulate matter falling off the first screen 64 and second screen 66 at the second end 62 of the reclaimer 24 to drop to the ground or into a mixer 26 (FIG. 1) with a clearance between filtered particulate matter and the back of the trailer 12. The chute 56 comprises a chute frame 70. The chute frame 70 may be adjusted to change the angle of the chute 56 relative to the ground and thus the distance between the deposited particulate matter and the back of the trailer 12.

The leveling assembly 58 adjusts the orientation of the screen assembly 54 and may comprise at least one cylinder 80. As shown, the cylinder 80 is proximate the second end 62 of the reclaimer. As shown, the cylinder 80 adjusts an orientation of the screen assembly 54 relative to the reclaimed fluid tank 55. The leveling assembly 58 may comprise more than one cylinder to enable a tilt adjustment of the first screen 64 and second screen 66 front-to-back and right-to-left. The leveling assembly 58 may alternatively comprise a pinned or slotted connection (not shown) between the screen assembly 54 and the reclaimed fluid tank 55. It is generally desirable for the leveling assembly 58 to position the first screen 64 and second screen 66 higher at the front end than at a back end of the screen assembly, while maintaining a level orientation from side-to-side. Thus, if the trailer 12 is on uneven terrain, the screen assembly 54 can maintain a flat orientation. Further, moisture content and flowrate of the spent mud may make it advantageous for the spent mud to spend more or less time on the screen assembly 54, which can be modified through front-to-back tilt of the screen assembly. A level sensor (not shown) may be provided to determine the front-to-back and side-to-side tilt of the screen assembly 54. The first screen 64 may be locked with the second screen 66 in orientation. Alternatively, in some applications it may be advantageous to provide the first screen 64 and second screen 66 with different or variable front-to-back tilt to maximize the reclamation of drilling fluid due to differing composition of material at the first screen and at the second screen.

Fluid passing through both the first screen 64 and the second screen 66 is collected in the reclaimed fluid tank 55, returned to the fluid tank 22, and thus "reclaimed" by the system 10 for use in excavation operations. Fluid is then provided through the excavation operations as described above, either alone or combined with unused fluid.

Figure 3:
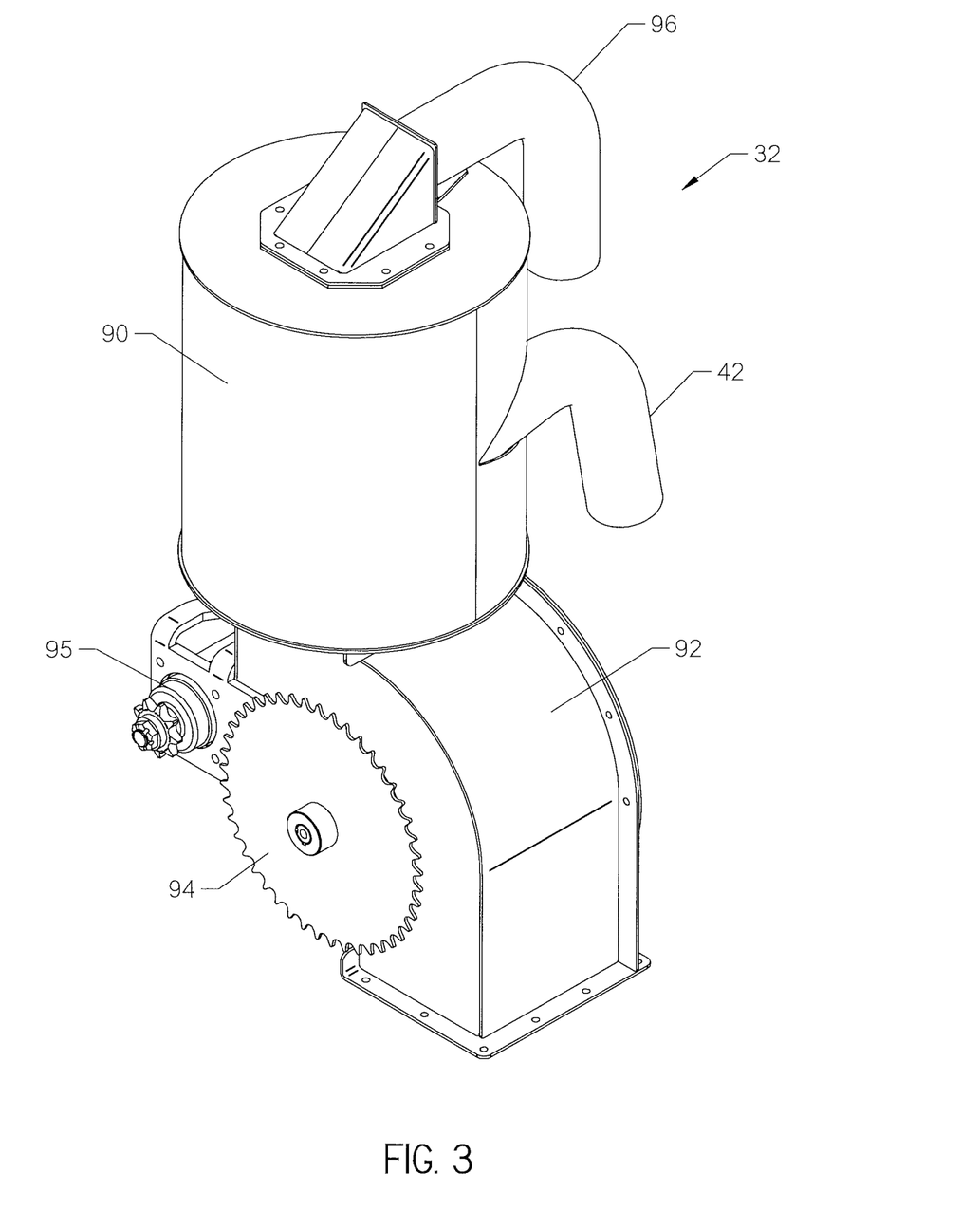
FIG. 3 is a perspective view of an airlock for use with the system of FIG. 1.

With reference now to FIG. 3, the airlock 32 is shown in more detail. The airlock 32 comprises a chamber having an upper tank 90 and a lower tank 92. The lower tank 92 comprises a sprocket 94 driven by a motor 95 for driving rotation of internally located impellers 112 (FIG. 4).

As previously discussed, the fluid return channel 42 transports used fluid from the jobsite to the air lock 32 at an inlet port. Used fluid enters the airlock 32 from the fluid return channel 42 at the upper tank 90. Air present in the fluid return channel 42 is removed from the airlock 32 through vacuum channel 96 located at the top of the upper tank. The vacuum channel 96 also provides maintenance of a vacuum pressure within the airlock 32 so that a vacuum pressure is delivered to the soft excavation unit 30 as will be described in more detail with reference to FIG. 5. Spent mud that enters the airlock 32 at the fluid return channel 42 exits at the bottom of the lower tank 92. The exit point for spent mud may be referred to as a first exit port, while vacuum channel 96 may be referred to as a second exit port.

Figure 4:
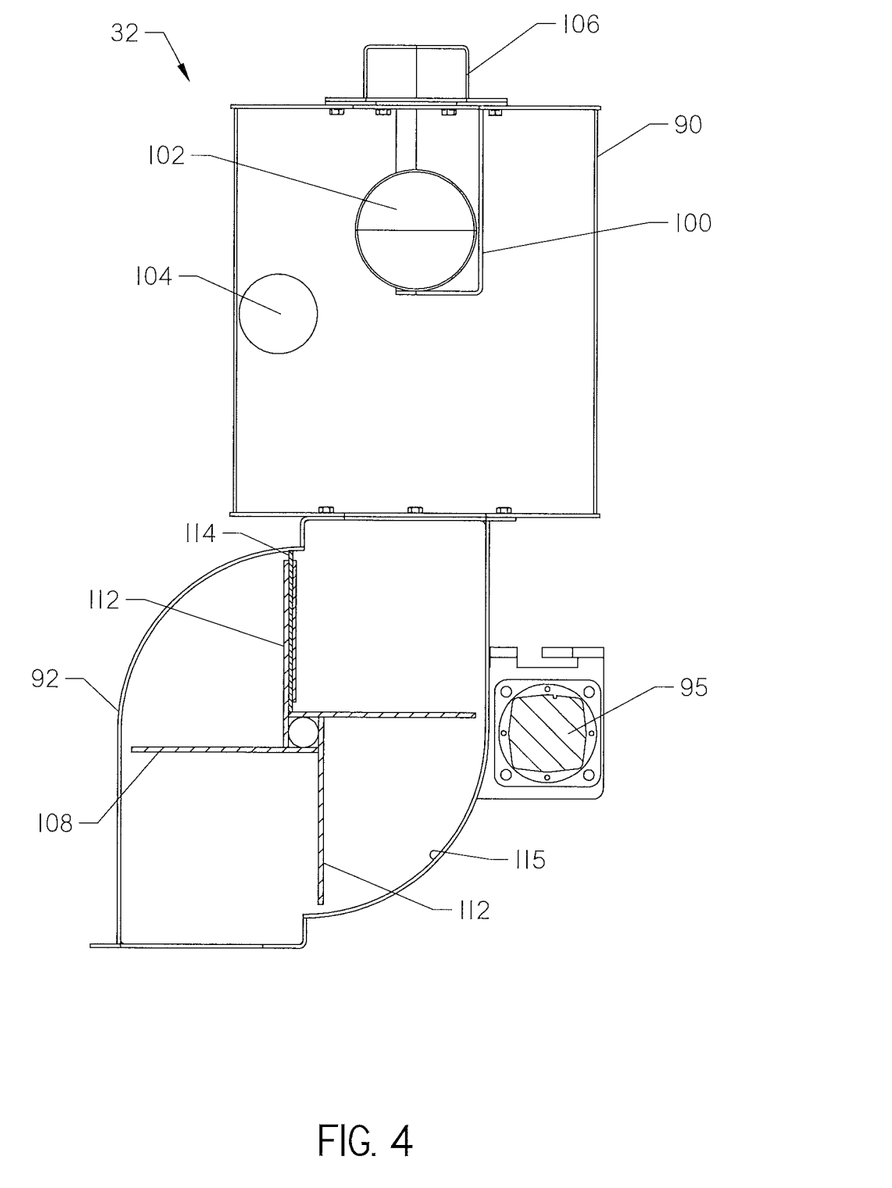
FIG. 4 is a cross-section side view of the airlock of FIG. 3.

With reference now to FIG. 4, internal components of the airlock 32 are shown. The upper tank 90 comprises a support bar 100, a float comprising a float ball 102, an inlet 104 and a vacuum exit 106. Air and spent mud enter the upper tank 90 from the fluid return channel 42 (FIG. 3) at the inlet 104. The support bar 100 holds the float ball 102 in a position below the vacuum exit 106. Spent mud is pulled toward the lower tank 92 due to gravitational force. The float ball 102 will float on the top surface of spent mud if the amount of mud in the upper tank 90 rises. Thus, before the spent mud threatens to exit the airlock 32 through the vacuum exit 106, the float ball 102 will seal the vacuum exit, preventing mud from entering the vacuum system 44 (FIG. 1).

The lower tank 92 comprises a mechanical flow regulator, such as an impeller 108. The impeller 108 comprises a plurality of arms 112, each with a flap 114 that contacts an inner surface 115 of the lower tank 92. The motor 95 drives the sprocket 94 (FIG. 3) which, in turn, rotates the impeller 108. As the arms 112 of the impeller 108 rotate, spent mud is removed from the airlock 32 and allowed to move to the reclaimer 24 (FIG. 1). The flaps 114 prevent the ambient pressure outside the airlock 32 from causing the upper tank 90 to lose vacuum pressure within the airlock 32.

Figure 5:
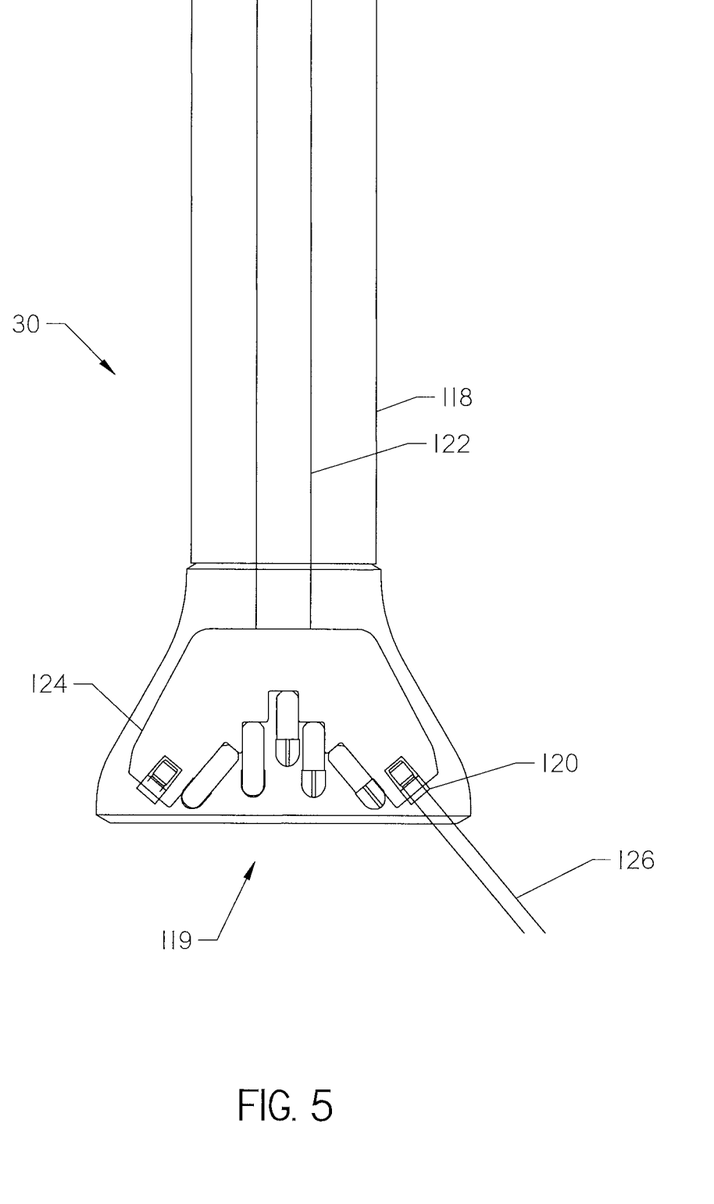
FIG. 5 is a partial cross-section side view of the soft excavation unit for use with the system of FIG. 1.

With reference now to FIG. 5, the internal workings of the soft excavation unit 30 are in cross-section. The soft excavation unit 30 comprises a body 118 with an opening 119, at least one jet 120, an internal shaft 122, and a rotating bit 124. The at least one jet 120 directs drilling fluid 126 to a surface of the ground. The rotating bit 124 is driven by the internal shaft 122 and is located within the body 118 such that no portion of the rotating bit extends beyond the opening 119 of the soft excavation unit 30. In this way, the rotating bit 124 is prevented from contacting an underground object and merely aids in displacing soil located within the perimeter of the opening 119.

One skilled in the art will appreciate that a vacuum pressure may be provided proximate the opening 119 so that spent mud can be removed from the site of soft excavation. This vacuum pressure may be provided between the shaft 122 and the body 118 such that spent mud is removed by the soft excavation unit 30 itself. Alternatively, a separate fluid return channel 42 (FIG. 1) may be provided at the site of soft excavation to remove spent mud. In either case, spent mud removed from the soft excavation location is directed to the airlock 32 (FIG. 3).

Figure 6:
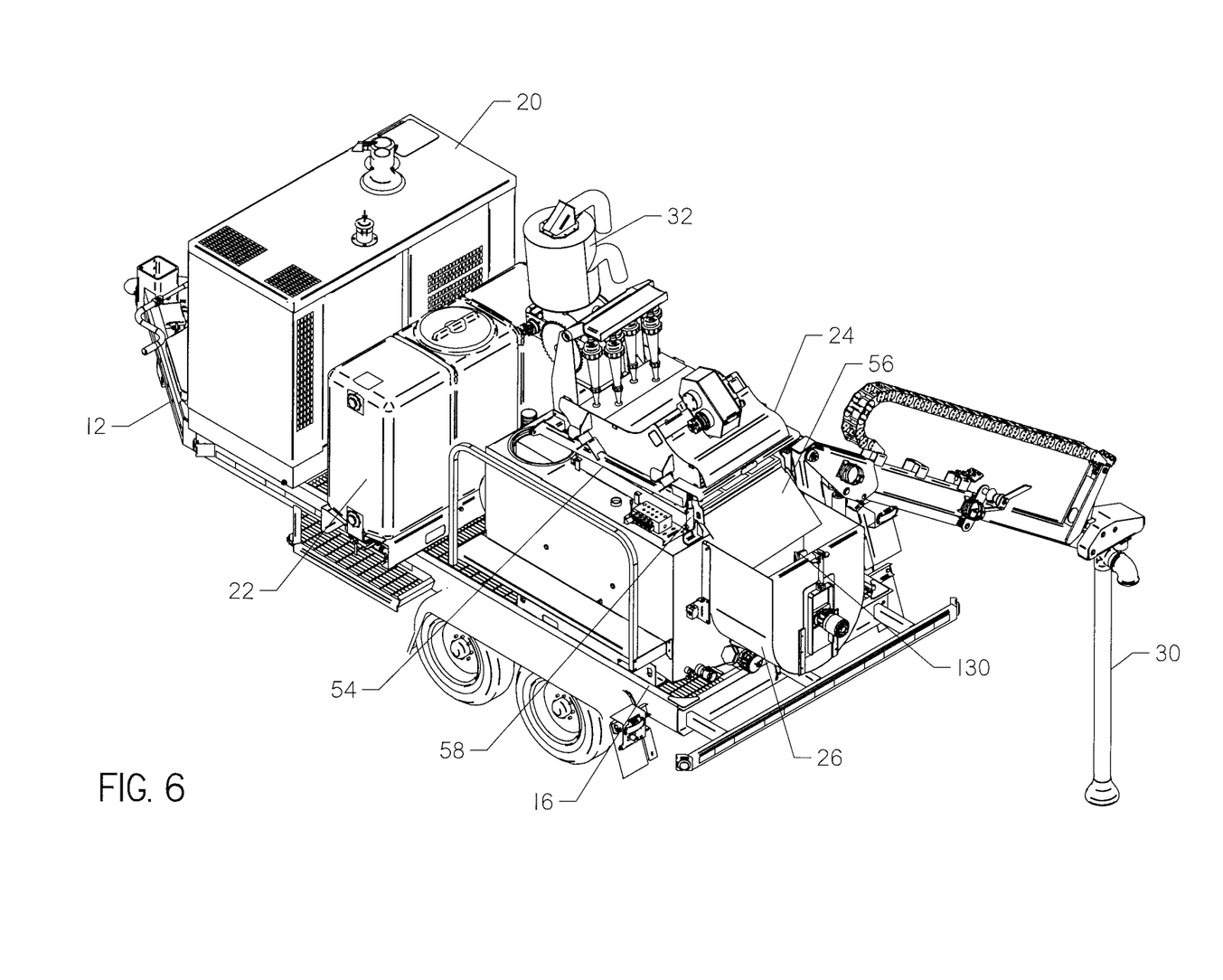
FIG. 6 is a top back perspective view of the embodiment of the fluid reclaimer system.

With reference to FIG. 6, the system 10 is shown with the mixer 26 located under the chute 56. The mixer comprises at least one rotating arm 130. Particulate matter in the mixer 26 may still be wet. In many locations, wet particulate matter may not be deposited on the ground or used to re-fill a pit used for drilling or a pothole created by the soft excavation unit 30. Thus, particulate matter entering the mixer may be mixed with a drying agent and stirred by the rotating arms 130 or an auger (not shown) in order to dry the particulate matter such that it may be deposited at the job site rather than at a disposal facility.

While most of the figures above have shown the system 10 in use with a soft excavation unit 30, the configuration shown in FIG. 7 may also be effective. With reference to FIG. 7, the system 10 is shown in use with a horizontal directional drilling system 200. The horizontal directional drilling system 200 comprises a carriage 202, a drill string 204 and a bit 206. The drill string 204 enters the ground at a drilling location 208. The carriage 202 provides thrust and rotation to the bit 206. Drilling fluid is provided from the fluid tank 22 of the system 10 to the horizontal directional drilling system 200 by way of fluid delivery channel 40. This drilling fluid may travel down the drill string 204 for use at the bit 206 to aid in drilling operations. Thus, the drill string may comprise a conduit through which fluid is transported from the surface to the drill bit. Fluid is injected into the borehole surrounding the drill bit and mixes with dirt, metal shavings, and other particulate matter to form spent mud which returns up the bore hole in the space between the outside of the drill string and the surface of the borehole to the drilling location 208. The spent mud may then be moved to the system 10 for processing by the reclaimer 24 by way of the return channel 42. A pump 210 may also be connected to the return channel 42 to help pump the spent mud back into the system 10.

One skilled in the art will appreciate the variations that may be effective in this invention. For example, auger boring, rock boring and vertical drilling operations which make use of drilling fluid may be adapted for the present invention such that drilling fluid can be reclaimed for repeated use.

The invention claimed is:

1. A system comprising:
a soft excavation unit, comprising:
a vacuum system;
a hollow, elongate body with an open end and a second end in communication with the vacuum system;
a rotatable bit wholly contained within the body and situated adjacent the open end;
a supply of fluid in communication with the rotatable bit;
in which a first fluid pathway interconnects the supply of fluid and the rotatable bit; and
in which a second fluid pathway interconnects the open end of the body and the second end of the body; and
a chamber comprising an inlet port, in which the second fluid pathway terminates at the inlet port;
a screen assembly situated outside the chamber, positioned to receive material that exits the chamber; and
a mechanical flow regulator disposed between the chamber and the screen assembly.

2. The system of claim 1 further comprising:
at least one desilter cone disposed between the mechanical flow regulator and the screen assembly.

3. The system of claim 1 wherein the screen assembly comprises a first screen and a second screen.

4. The system of claim 1, further comprising a shaft disposed within the body and connected to the rotatable bit.

5. The system of claim 1 further comprising:
a return channel connected to the second end of the body;
in which the second fluid pathway interconnects the second end of the body and the return channel.

6. The system of claim 1 in which the bit comprises:
at least one jet disposed on the rotating bit.

7. The system of claim 6 in which the jet defines an end of the first fluid pathway.

8. The system of claim 6 in which the jet is configured to direct fluid from the first fluid pathway out of the open end of the body.

9. A system comprising:
a supply of fluid; and
an integrally formed soft excavation system, comprising:
an elongate body having an open end;
a rotatable bit wholly contained within the elongate body and situated adjacent the open end;
a supply pathway that interconnects the supply of fluid and the rotatable bit;
a disposal pathway having an inlet end at the open end of the elongate body and an opposed discharge end; and
a vacuum system configured to generate a vacuum pressure within the elongate body;
in which the rotatable bit and elongate body are formed as a single unit.

10. The system of claim 9 further comprising:
a jet located on the rotatable bit in fluid communication with the supply pathway and configured to direct fluid out of the open end of the elongate body.

11. The system of claim 10 in which the jet is configured to expel fluid at a sufficient velocity to dislodge soil from a ground surface.

12. The system of claim 9 in which the excavation system further comprises:
a shaft having opposed first and second ends and contained within the elongate body, wherein the rotatable bit is supported on the shaft.

13. The system of claim 9 in which the rotatable bit is disposed a fixed distance from the open end of the elongate body.

14. A method of using the system of claim 9 comprising:
identifying an area to be excavated;
thereafter, directing fluid from the supply pathway to dislodge soil at the area to be excavated;
activating the vacuum unit to generate a low pressure within the elongate body, thereby directing dislodged soil to the disposal pathway; and
rotating the rotatable bit.

15. A method of using the system of claim 9 comprising:
identifying an area to be excavated;
thereafter, directing fluid from supply pathway to dislodge soil at the area to be excavated;
activating the vacuum unit to generate a vacuum pressure within the elongate body, thereby directing dislodged soil to the disposal pathway; and
rotating the rotatable bit;
placing dislodged soil on the screen assembly;
vibrating the screen assembly to separate the stream of predominantly liquid material from the stream of predominantly solid material.

16. The method of claim 15 further comprising:
drying the stream of predominantly solid material; and
placing the dried solid material at the area to be excavated.

17. The method of claim 15 further comprising:
returning the stream of predominantly liquid material to the supply of fluid.

18. A system comprising:
a supply of fluid; and
an excavation system, comprising:
   an elongate body having an open end;
   a rotatable bit wholly contained within the elongate body and situated adjacent the open end;
   a supply pathway that interconnects the supply of fluid and the rotatable bit;
   a disposal pathway having an inlet end at the open end of the elongate body and an opposed discharge end; and
   a vacuum system configured to generate a vacuum pressure within the elongate body; and
a reclamation system, comprising:
   a vacuum pressure chamber having an inlet port in communication with the discharge end of the disposal pathway; and
   a screen assembly situated outside the chamber, positioned to receive material that exits the vacuum pressure chamber and which produces separate streams of predominantly solid and predominantly liquid material.

19. The system of claim 8, further comprising a mixer positioned to receive the stream of predominantly solid material.

20. The system of claim 19 in which the mixer contains a drying agent.

21. The system of claim 18 further comprising a return pathway interconnecting the predominantly liquid material at the separation system and the supply of fluid.

\* \* \* \* \*

UNITED STATES PATENT AND TRADEMARK OFFICE
CERTIFICATE OF CORRECTION

PATENT NO.        : 11,185,803 B2
APPLICATION NO.   : 16/521372
DATED             : November 30, 2021
INVENTOR(S)       : Sewell et al.

Page 1 of 1

It is certified that error appears in the above-identified patent and that said Letters Patent is hereby corrected as shown below:

In the Claims

Column 7, Claim 19, Line 1, please delete "8" and substitute therefore "18".

Signed and Sealed this
Eleventh Day of January, 2022

Drew Hirshfeld
*Performing the Functions and Duties of the
Under Secretary of Commerce for Intellectual Property and
Director of the United States Patent and Trademark Office*